United States Patent
Koo et al.

(10) Patent No.: US 7,433,553 B2
(45) Date of Patent: Oct. 7, 2008

(54) HYBRID WAVEGUIDE SENSOR

(75) Inventors: Won Hoe Koo, Seoul (KR); Dong Ho Shin, Seoul (KR); Il Kweon Joung, Ansan-si (KR); Gwan Su Lee, Seoul (KR); Soo Jin Jung, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/896,102

(22) Filed: Aug. 29, 2007

(65) Prior Publication Data

US 2008/0056640 A1  Mar. 6, 2008

(30) Foreign Application Priority Data

Aug. 29, 2006  (KR)  ........................ 10-2006-0082325

(51) Int. Cl.
*G02B 6/10* (2006.01)

(52) U.S. Cl. ........................................... 385/12

(58) Field of Classification Search ................... 385/12
See application file for complete search history.

(56) References Cited

U.S. PATENT DOCUMENTS 6,432,364 B1 * 8/2002 Negami et al. ............ 422/82.11

FOREIGN PATENT DOCUMENTS

KR  10-2005-0036404  4/2005
KR  10-2006-0029657  4/2006

* cited by examiner

*Primary Examiner*—Sarah Song

(57) ABSTRACT

A hybrid waveguide sensor comprises a dielectric layer having one optical signal input section formed in one end thereof and one optical signal output section formed in the other end thereof, the dielectric layer having a predetermined size of thin metal film provided therein; a polymer layer formed on and under the dielectric layer and having an opening formed to expose a portion of the dielectric layer corresponding to the thin metal film, the opening having a larger width than the thin metal film; and a receptor layer formed on a portion of the dielectric layer corresponding to the thin metal film exposed by the opening.

24 Claims, 5 Drawing Sheets

HYBRID WAVEGUIDE SENSOR

CROSS-REFERENCE TO RELATED APPLICATIONS

This application claims the benefit of Korean Patent Application No. 10-2006-0082325 filed with the Korea Intellectual Property Office on Aug. 29, 2006, the disclosure of which is incorporated herein by reference.

BACKGROUND OF THE INVENTION

1. Field of the Invention

The present invention relates to a hybrid waveguide sensor which can reduce a propagation loss and can enhance sensitivity.

2. Description of the Related Art

As the environment changes and is polluted, a need for environmental sensors, bio-sensors, and gas sensors gradually increases. Particularly, there is a need for such a sensor that is much more sensitive and is small enough to carry.

The development of sensors has been continued for dozens of years. Among a variety of techniques which have contributed to the development of sensors, the technique for optical sensors have been significantly developed. Particularly, sensors using surface plasmons (SP) have more excellent sensitivity than the other sensors. Therefore, the sensors using surface plasmons are being actively manufactured.

Surface plasmons are charge-density oscillations which propagate along an interface between materials with dielectric constants having a reverse sign. In general, surface plasmons exist at the interface between metal having the negative sign and a dielectric having the positive sign, and can be excited by electrons accelerated at high speed and optical waves. Electromagnetic waves which are coupled to surface plasmons so as to propagate are referred to as surface plasmon polarions (hereinafter, referred to as "SPP").

Since the wave vector of the surface plasmon is larger than those of surrounding materials, the SPP is bound to a metal surface. Therefore, the interface between metal and a dielectric can be considered as a two-dimensional optical waveguide.

In view of the optical waveguide, SPPs to be generated at the interface between metal and a dielectric are effectively bound to the metal surface, while a propagation distance thereof is as short as dozens of mm in a visible-ray region. However, when the thickness of metal is limited to several nm to dozens of nm such that SPPs propagating at the interface is coupled to each other, long-range transmission of light can be implemented. These are referred to as long-range surface plasmon polariton (LR-SPP) modes. The field profile of the LR-SPP modes is widely distributed in a dielectric around a thin metal film. Therefore, a propagation loss of light is small, and a coupling characteristic with optical fiber is excellent. Accordingly, the LR-SPP modes are applied to various optical elements.

Hereinafter, a conventional metal waveguide using LR-SPP modes and a conventional waveguide sensor using the same will be described with reference to FIGS. 1 and 2.

Figure 1:
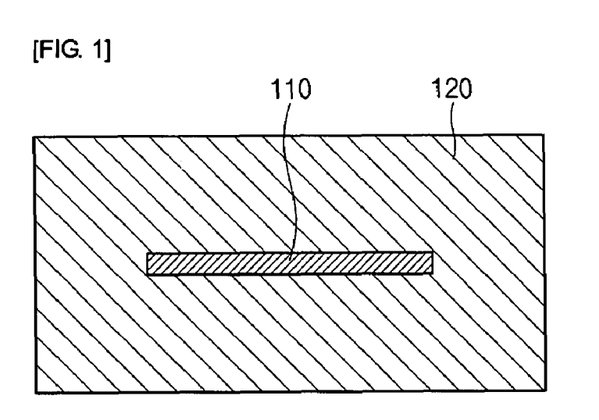
FIG. 1 is a sectional view of a conventional metal waveguide using LR-SPP modes.

FIG. 1 is a sectional view of a conventional metal waveguide using LR-SPP modes.

Referring to FIG. 1, the conventional metal waveguide includes a core composed of metal 110 of which the cross-section has a predetermined thickness and width and which is formed in a strip shape; and a dielectric 120 surrounding the core. The entire structure of the waveguide may be also formed in a strip shape.

Such a conventional waveguide couples light to the metal 110 such that SPP waves propagate in the longitudinal direction of the metal 110. In this case, since the metal 110 has a predetermined thickness and width of cross-section in a direction perpendicular to the propagation direction of the SPP waves, the SPP waves can be two-dimensionally bound, which makes it possible to implement a waveguide using LR-SPP modes.

Figure 2:
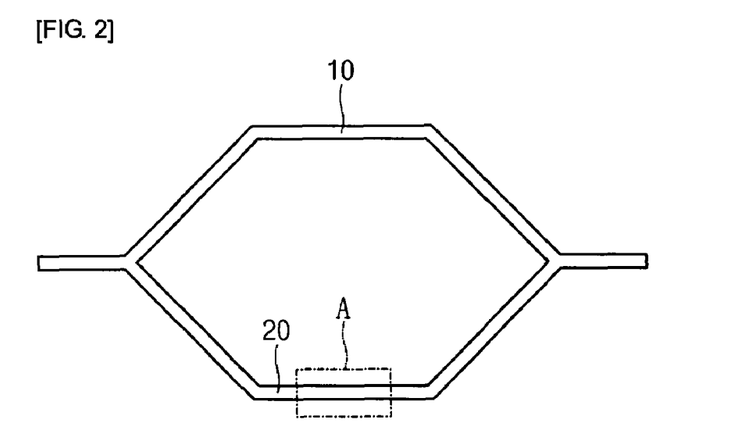
FIG. 2 is a plan view of a conventional waveguide sensor using the waveguide shown in FIG. 1.

FIG. 2 is a plan view of a conventional waveguide sensor using the waveguide shown in FIG. 1.

As shown in FIG. 2, the waveguide shown in FIG. 1 is constructed as an MZI (Mach-Zehnder Interferometer) type waveguide. Then, a reference signal is applied to one arm 10, and a substance to be measured is caused to interact with the waveguide in the second arm 20 such that a phase shift generated by receiving a modulated signal is detected. Then, it is possible to sense a type or concentration of the substance.

When the entire core of the above-described waveguide is formed of metal such that the waveguide can be utilized as a sensor using the reaction of a sensing substance with the surface of the metal, high sensitivity can be obtained because of the reaction of the metal. However, an overall propagation loss is large.

Meanwhile, although not shown, a dielectric waveguide sensor composed of a general dielectric has little propagation loss of light. Therefore, the dielectric waveguide sensor has a considerable advantage in maintaining a basic structure as a sensor. However, the dielectric waveguide sensor has lower sensitivity than the metal waveguide sensor.

Therefore, in this technical field, there is a demand for reducing a propagation loss and enhancing sensitivity.

SUMMARY OF THE INVENTION

An advantage of the present invention is that it provides a hybrid waveguide sensor which can reduce a propagation loss and can enhance sensitivity.

Additional aspect and advantages of the present general inventive concept will be set forth in part in the description which follows and, in part, will be obvious from the description, or may be learned by practice of the general inventive concept.

According to an aspect of the invention, a hybrid waveguide sensor comprises a dielectric layer having one optical signal input section formed in one end thereof and one optical signal output section formed in the other end thereof, the dielectric layer having a predetermined size of thin metal film provided therein; a polymer layer formed on and under the dielectric layer and having an opening formed to expose a portion of the dielectric layer corresponding to the thin metal film, the opening having a larger width than the thin metal film; and a receptor layer formed on a portion of the dielectric layer corresponding to the thin metal film exposed by the opening.

Preferably, the dielectric layer has a protrusion formed on the upper surface thereof, the protrusion being formed in a straight line which connects the optical signal input section as one end of the dielectric layer and the optical signal output section as the other end thereof.

Preferably, the protrusion passes over the thin metal film.

Preferably, the dielectric layer has a protrusion formed on the upper surface thereof, the protrusion formed in one line at the optical signal input section as one end of the dielectric layer diverges into two lines at a predetermined position to thereby form first and second arms, and the first and second arms join each other at a predetermined position such so as to form one line at the optical signal output section.

Preferably, the first arm of the protrusion passes over the thin metal film.

Preferably, in the thin metal film, light is transmitted along the surface thereof as surface plasmon polariton modes.

According to another aspect of the invention, a hybrid waveguide sensor comprises a dielectric layer having one optical signal input section formed in one end thereof and one optical signal output section formed in the other end thereof, the dielectric layer having predetermined sizes of first and second thin metal films disposed therein so as to be spaced at a predetermined distance; a polymer layer formed on and under the dielectric layer and having first and second openings formed to expose portions of the dielectric layer corresponding to the first and second thin metal films, respectively, the first and second openings having a larger width than the first and second thin metal films; and a receptor layer formed on a portion of the dielectric layer corresponding to the first thin metal film exposed by the first opening.

Preferably, the dielectric layer has a protrusion formed on the upper surface, the protrusion formed in one line at the optical signal input section as one end of the dielectric layer diverges into two lines at a predetermined position to thereby form first and second arms, and the first and second arms join each other at a predetermined position so as to form one line at the optical signal output section.

Preferably, the first arm of the protrusion passes over the first thin metal film, and the second arm of the protrusion passes over the second thin metal film.

According to a further aspect of the invention, a hybrid waveguide sensor comprises a dielectric layer having one optical signal input section formed in one end thereof and three of first to third optical signal output sections formed in the other end thereof, the dielectric layer having a predetermined size of thin metal film provided therein; a polymer layer formed on and under the dielectric layer and having an opening formed to expose a portion of the dielectric layer corresponding to the thin metal film, the opening having a larger width than the metal thin film; and a receptor layer formed on a portion of the dielectric layer corresponding to the thin metal film exposed by the opening.

Preferably, the dielectric layer has a protrusion formed on the upper surface thereof, and the protrusion formed in one line at the optical signal input section as one end of the dielectric layer diverges into two lines at a predetermined position to thereby form first and second arms, the first arm being connected to the first optical signal output section and the second arm being connected to the third optical signal output section.

Preferably, the first arm of the protrusion passes over the thin metal film.

Preferably, the dielectric layer has another protrusion formed on the upper surface thereof so as to extend in a line from the second optical signal output section between the first and third optical signal output sections.

According to a still further aspect of the invention, a hybrid waveguide sensor comprises a dielectric layer having one optical signal input section formed in one end thereof and three of first to third optical signal output sections formed in the other end thereof, the dielectric layer having predetermined sizes of first and second thin metal films disposed therein so as to be spaced at a predetermined distance from each other; a polymer layer formed on and under the dielectric layer and having first and second openings formed to expose portions of the dielectric layer corresponding to the first and second thin metal films, respectively, the first and second openings having a larger width than the first and second thin metal films; and a receptor layer formed on a portion of the dielectric layer corresponding to the first thin metal film exposed by the first opening.

Preferably, the dielectric layer has a protrusion formed on the upper surface thereof, and the protrusion formed in one line at the optical signal input section as one end of the dielectric layer diverges into two lines at a predetermined position to thereby form first and second arms, the first arm being connected to the first optical signal output section and the second arm being connected to the third optical signal output section.

Preferably, the first arm of the protrusion passes over the first thin metal film, and the second arm of the protrusion passes over the second thin metal film.

Preferably, the dielectric layer has another protrusion formed on the upper surface thereof so as to extend in a line from the second optical signal output section between the first and third optical signal output sections.

According to a still further aspect of the invention, a hybrid waveguide sensor comprises a dielectric layer having one optical signal input section and one optical signal output section formed in one end thereof, the dielectric layer having a predetermined size of thin metal film provided therein; a polymer layer formed on and under the dielectric layer and having an opening formed to expose a portion of the dielectric layer corresponding to the thin metal film, the opening having a larger width than the thin metal film; and a receptor layer formed on a portion of the dielectric layer corresponding to the thin metal film exposed by the opening.

Preferably, the dielectric layer has two lines of protrusions formed on the upper surface thereof, the protrusions are separately formed in a line at the optical signal input section and the optical signal output section, respectively, which are formed in one end of the dielectric layer, two lines of the protrusions join each other at a predetermined position to thereby form one line, and the line diverges into two lines at a predetermined position so as to extend to the other end of the dielectric layer.

Preferably, the protrusion passes over the thin metal film.

Preferably, the hybrid waveguide sensor further comprises a mirror surface provided on the other end of the dielectric layer.

Preferably, the dielectric layer has two lines of protrusions formed on the upper surface, and the protrusions are separately formed at the optical signal input section and the optical signal output section, respectively, which are formed in one end of the dielectric layer, the protrusions extending to the other end of the dielectric layer.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a hybrid waveguide sensor according to an embodiment of the present invention will be described in detail with reference to the accompanying drawings.

First Embodiment

Figure 3:
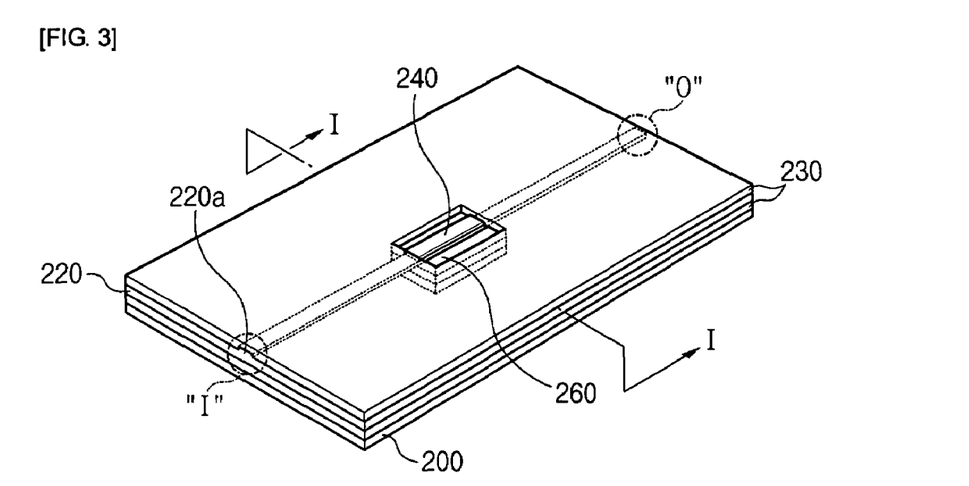
FIG. 3 is a perspective view of a hybrid waveguide sensor according to a first embodiment of the invention.
Figure 4:
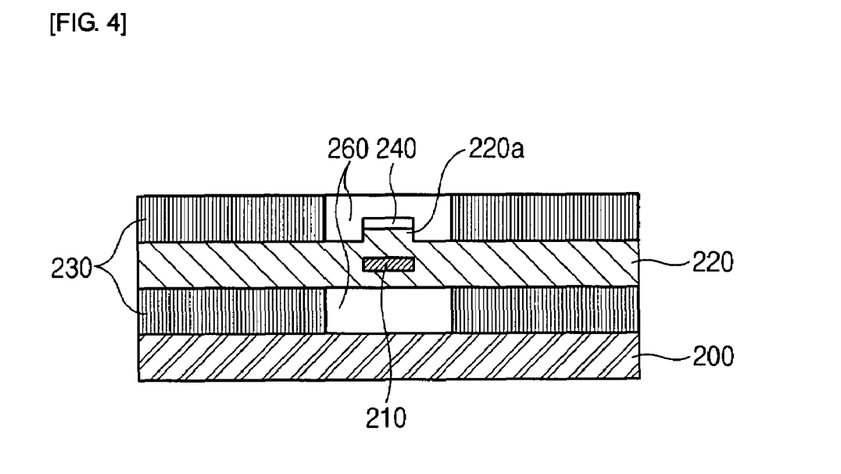
FIG. 4 is a sectional view taken along II-II' line of FIG. 3.
Figure 5A:
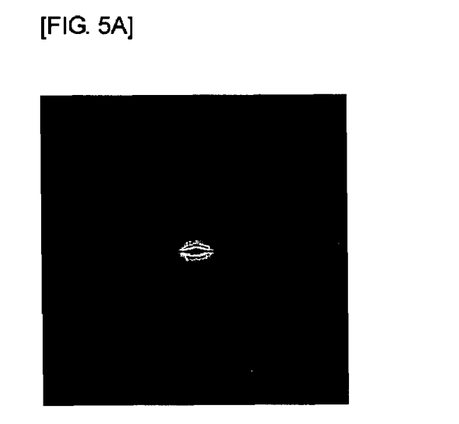
FIGS. 5A and 5B are diagrams showing simulations of mode shape in a metal waveguide portion and a dielectric waveguide portion, respectively.
Figure 5B:
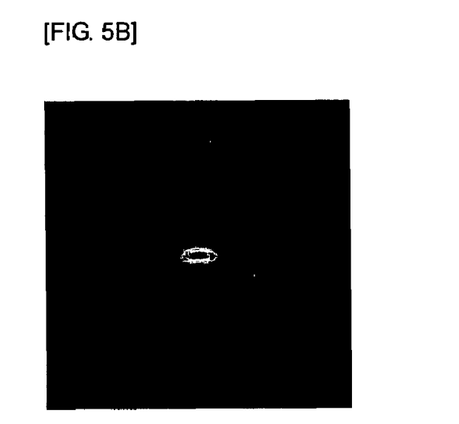

Referring to FIGS. 3 to 5, a hybrid waveguide sensor according to a first embodiment of the invention will be described in detail.

FIG. 3 is a perspective view of the hybrid waveguide sensor according to the first embodiment of the invention. FIG. 4 is a sectional view taken along I-I' line of FIG. 3.

As shown in FIGS. 3 and 4, the hybrid waveguide sensor according to the first embodiment includes a dielectric layer 220 having one optical signal input section I formed in one end thereof, one optical signal output section O formed in the other end thereof, and a predetermined size of thin metal film 210 provided therein.

Under and on the dielectric layer 220, a polymer layer 230 is formed. The polymer layer 230 has an opening 260 formed to expose a portion of the dielectric layer 220 corresponding to the thin metal film 210, the opening 260 having a larger width than the thin metal film 210. The polymer layer 230 including the thin metal film 210 and the dielectric layer 220 is formed on a substrate 200.

On a portion of the dielectric layer 220, exposed by the opening 260 and corresponding to the thin metal film 210, a receptor layer 240 is formed.

The dielectric layer 220 has a protrusion 220a formed on the upper surface thereof, the protrusion 220a being formed in a straight line which connects the optical signal input section I at the one end of the dielectric layer 220 and the optical signal output section O at the other end thereof. Preferably, the protrusion 220a is formed to pass over the thin metal film 210.

A metal waveguide portion composed of the thin metal film 210 and the dielectric layer 220 formed on and under the thin metal film 210 serves as a sensing part. The other portions excluding the sensing part, that is, portions of the protrusion 220a and portions of the dielectric layer 220 under the protrusion 220a, where the thin metal film 210 is not formed, serve as a dielectric waveguide part.

In other words, in order to overcome low sensitivity of an existing dielectric waveguide, the metal waveguide portion using the thin metal film 210 is used as the sensing part. However, when the overall structure is constructed by the metal waveguide, there can be a limit in propagation length because of a large propagation loss. Therefore, the sensing part is constructed by the metal waveguide composed of the thin metal film 210 and the dielectric layer 220 surrounding the thin metal film 210, and the other portion is constructed by the dielectric waveguide composed of the dielectric layer 220.

In the thin metal film 210 of the sensing part, it is preferable that light is transmitted along the surface thereof as a surface plasmon polariton (SPP) mode. That is, the hybrid waveguide sensor transmits a signal by using the surface plasmon polariton mode.

In the hybrid waveguide sensor of the invention, the other portion excluding the sensing part is constructed by the dielectric layer 220, where a propagation loss is small, so as to guide input/output beams. The sensing part is constructed by the metal waveguide including the thin metal film 210. Therefore, the hybrid waveguide sensor can have excellent sensitivity due to the surface plasmon polariton properties of the metal waveguide.

FIGS. 5A and 5B are diagrams showing simulations of mode shape in the metal waveguide portion and the dielectric waveguide portion, respectively.

In the present invention, the respective mode shapes are similar to each other, as shown in FIGS. 5A and 5B. Therefore, it is possible to reduce a coupling loss at both ends of the sensor.

In this case, the size and shape of mode can be varied in accordance with the width and thickness of the thin metal film 210 and the shape of the dielectric waveguide.

In the hybrid waveguide sensor of the invention, the receptor layer 240 exposed by the opening 260 and formed on the dielectric layer 220 above the thin metal film 210 is exposed to a substance which is to be measured. A change when a substance to be measured reacts with the receptor layer 240 can be checked by measuring a propagation loss between input and output, which is caused by the interaction with SPP modes to be generated in the thin metal film 210.

That is, when a substance to be measured reacts with the receptor layer 240 formed in the sensing part, an external refractive index around the receptor layer 240 changes, and the substance on the metal waveguide including the thin metal film 210 changes in thickness. At this time, the SPP mode in the thin metal film 210 interacts with the change of the substance, thereby having an effect on a change in intensity of light. Then, the change in refractive index and thickness can be measured by measuring the change in intensity of light.

As the hybrid waveguide sensor is constructed in such a manner, the intensity of light to be incident can be maintained at the maximum. A large difference in intensity in accordance with the substance reaction in the thin metal film 210 can be obtained. Further, a propagation loss can be minimized in the dielectric waveguide part such that a signal with changed intensity is obtained at the maximum.

Further, the thicknesses and dielectric constants of substances can be adjusted depending on a necessary function. Therefore, the waveguide can be optimized into a waveguide having a necessary function. Further, the structure of the waveguide is simple, which makes it possible to facilitate sensor array construction.

Second Embodiment

Figure 6:
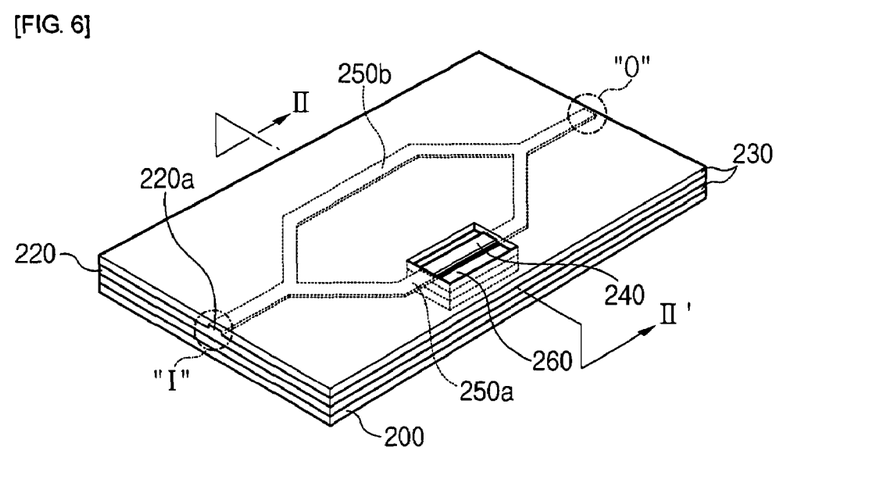
FIG. 6 is a perspective view of a hybrid waveguide sensor according to a second embodiment of the invention.
Figure 7:
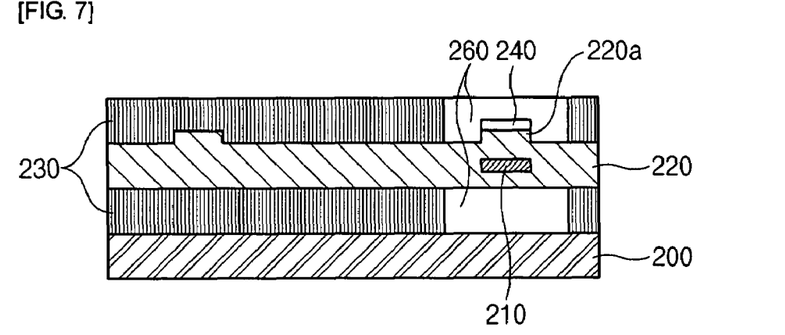
FIG. 7 is a sectional view taken along II-II' line of FIG. 6.

Referring to FIGS. 6 and 7, a hybrid waveguide sensor according to a second embodiment of the invention will be described in detail. However, the descriptions of the same portions as the first embodiment will be omitted.

FIG. 6 is a perspective view of the hybrid waveguide sensor according to the second embodiment of the invention. FIG. 7 is a sectional view taken along II-II' line of FIG. 6.

The hybrid waveguide sensor according to the second embodiment of the invention has almost the same construction as the hybrid waveguide sensor according to the first embodiment. As shown in FIGS. 6 and 7, however, the hybrid waveguide sensor according to the second embodiment has a protrusion 220a formed in a different shape from that of the hybrid waveguide sensor according to the first embodiment. More specifically, although the protrusion 220a is formed in one line at the optical signal input section I as one end of the dielectric layer 220, the protrusion 220a diverges into two lines at a predetermined position, thereby forming first and second arms 205a and 250b. Then, the first and second arms 250a and 250b join each other at a predetermined position so as to form one line at the optical signal output section O.

In this case, the first arm 250a of the protrusion 220a is formed to pass over the thin metal film 210.

That is, in the second embodiment of the invention, an MZI (Mach-Zehnder Interferometer) type waveguide is constructed. The second arm 250b which does not pass over the thin metal film 210 receives a reference signal, and the first arm 250a which passes over the thin metal film 210 receives a signal modulated by interacting a substance to be measured with the receptor layer 240. Then, a phase difference between both ends, generated by an interference signal, is detected so that changes in refractive index and thickness of the substance can be measured.

The MZI type waveguide sensor according to the invention can obtain a further enhanced characteristic in terms of overall propagation loss than an existing metal waveguide sensor using only a thin metal film.

In order to calculate the propagation loss, the dielectric waveguide part is constructed by a rib/ridge waveguide having the protrusion 220a formed on the upper surface of the dielectric layer 220.

When the MZI type waveguide sensor with an overall length of 6 mm is constructed, and when the thin metal film is entirely used to construct an LR-SPP sensor as in the related art, an overall propagation loss is more than 10 dB. However, when only the sensing part is constructed by the thin metal film as in the invention, a propagation loss of about 0.56 dB is generated, and a coupling loss with the rib/ridge dielectric waveguide part is about 0.27 dB. In this case, the overall propagation loss is only 1 to 2 dB. Therefore, it is possible to implement a sensor which has no limitation in length and exhibits excellent sensitivity.

Figure 8:
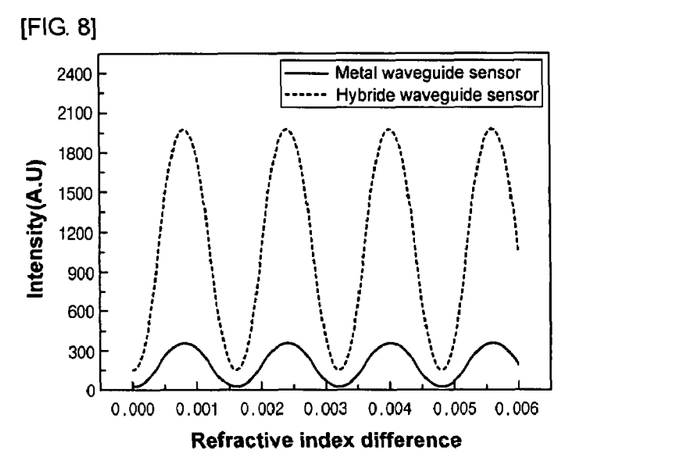
FIG. 8 is a graph showing a difference in intensity modulation between a metal waveguide sensor and a hybrid waveguide sensor.

FIG. 8 is a graph showing a difference in intensity modulation between the metal waveguide sensor and the hybrid waveguide sensor.

Referring to FIG. 8, an intensity difference occurs due to a propagation loss in the metal waveguide sensor, which means that the hybrid waveguide sensor can obtain a higher sensitivity resolution than the metal waveguide sensor. Further, when the hybrid waveguide sensor is compared with the dielectric waveguide sensor, the hybrid waveguide sensor can measure a refractive index change of $7 \times 10^{-8}$ to $7 \times 10^{-9}$, while the dielectric waveguide sensor can measure a refractive index change of $2 \times 10^{-6}$ to $2 \times 10^{-7}$.

The hybrid waveguide sensor according to the second embodiment can obtain the same operation and effect as the first embodiment.

Modification of Second Embodiment

Figure 9:
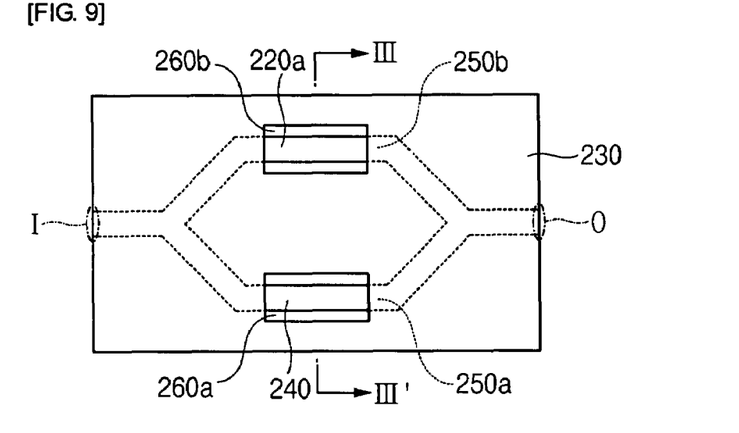
FIG. 9 is a plan view showing a modification of the second embodiment.
Figure 10:
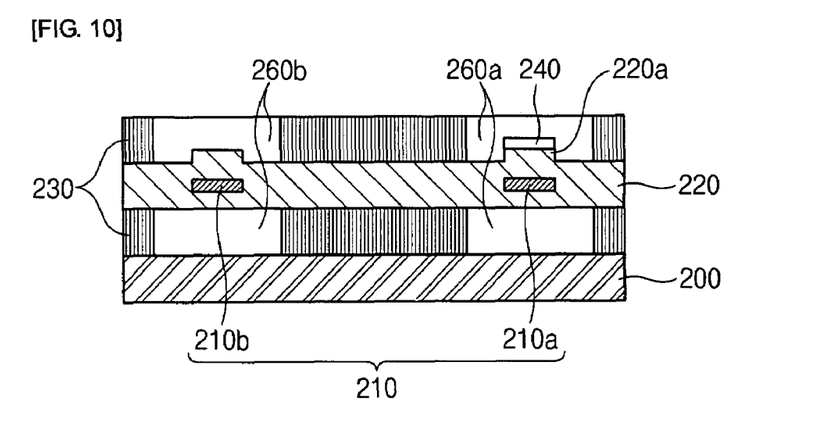
FIG. 10 is a sectional view taken along III-III' line of FIG. 9.

Referring to FIGS. 9 and 10, a modification of the second embodiment will be described.

FIG. 9 is a plan view showing a modification of the second embodiment. FIG. 10 is a sectional view taken along III-III' line of FIG. 9.

A hybrid waveguide sensor according to the modification of the second embodiment has almost the same construction as the hybrid waveguide sensor according to the second embodiment. As shown in FIGS. 9 and 10, however, the hybrid waveguide sensor according to the modification of the second embodiment is different from the hybrid waveguide sensor according to the second embodiment in that another thin metal film 210b is provided in the dielectric layer 220 under the second arm 250b.

That is, the hybrid waveguide sensor according to the modification of the second embodiment includes a dielectric layer 220 having one optical signal input section I formed in one end thereof, one optical signal output section O formed in the other end thereof, and predetermined sizes of first and second thin metal films 210a and 210b which are provided in the dielectric layer 220 so as to be spaced at a predetermined distance from each other; and a polymer layer 230 formed on and under the dielectric layer 220 and having first and second openings 260a and 260b which expose portions of the dielectric layer 220b corresponding to the first and second thin metal films 210a and 219b, respectively. The first and second openings 260a and 260b are formed to have a larger width than the first and second thin metal films 210a and 210b.

The dielectric layer 220 has a protrusion 220a formed on the upper surface thereof. Although the protrusion 220a is formed in one line at the optical signal input section I as one end of the dielectric layer 220, the protrusion 220a diverges into two lines at a predetermined position, thereby forming the first and second arms 205a and 250b. Further, the first and second arms 250a and 250b join each other at a predetermined position so as to form one line at the optical signal output section O.

The first arm 205a of the protrusion 220a is formed to pass over the first thin metal film 210a, and the second arm 250b of the protrusion 220a is formed to pass over the second thin metal film 210b.

In the modification of the second embodiment, a receptor layer 240 is formed only on a portion of the dielectric layer 220 exposed by the first opening 260a and corresponding to the first thin metal film 210a, but is not formed on a portion of the dielectric layer 200 exposed by the second opening 260b.

In such a structure, a portion of the second arm 250b serving as a reference part has the same condition as a portion of the first arm 250a serving as a sensing part such that actual sensitivity with respect to the reaction is further enhanced. That is, in the second embodiment, a reaction substance to be measured is inputted only into the sensing part having the receptor layer 240 formed therein. In the modification, however, a substance to be measured is inputted into the reference part and the sensing part, respectively. Then, a difference between the respective parts is reduced with respect to a signal on an idiosyncratic reaction substance such that a practical condition is met.

The modification of the second embodiment can obtain the same operation and effect as the second embodiment. Further, as described above, the sensing part including the thin metal film 210 except for the receptor layer is additionally constructed in the second arm 205b. Therefore, the surrounding environmental condition of a substance to be measured can be measured together, which makes it possible to perform sensing with higher precision.

Third Embodiment

Figure 11:
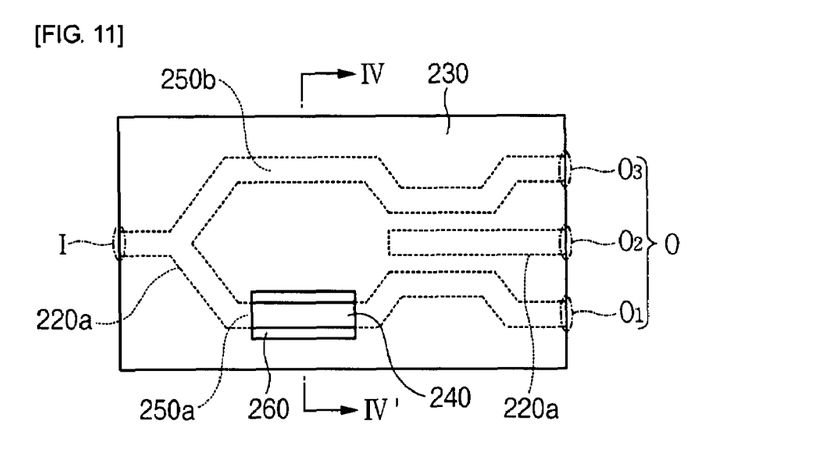
FIG. 11 is a plan view of a hybrid waveguide sensor according to a third embodiment of the invention.

Referring to FIGS. 11 and 7, a hybrid waveguide sensor according to a third embodiment of the invention will be described in detail.

FIG. 11 is a plan view of a hybrid waveguide sensor according to a third embodiment of the invention. FIG. 7 also serves as a sectional view taken along IV-IV' line of FIG. 11.

As shown in FIGS. 11 and 7, the hybrid waveguide sensor according to the third embodiment of the invention includes a dielectric layer 220 having one optical signal input section I formed in one end thereof, three of first to third optical signal output sections $O_1$ to $O_3$ formed in the other end thereof, and a predetermined size of thin metal film 210 provided therein; a polymer layer 230 formed on and under the dielectric layer 220 and having an opening 260 formed to expose a portion of the dielectric layer 220 corresponding to the thin metal film 210, the opening 260 having a larger width than the thin metal film 210; and a receptor layer 240 formed on a portion of the dielectric layer 220 corresponding to the thin metal film 210 exposed by the opening 260.

The dielectric layer 220 has a protrusion 220a formed on the upper surface thereof. Although the protrusion 220a is formed in one line at the optical signal input section I as one end of the dielectric layer 220, the protrusion 220a diverges into two lines at a predetermined position, thereby forming the first and second arms 205a and 250b. The first arm 250a is connected to the first optical signal output section $O_1$, and the second arm 250b is connected to the third optical signal output section $O_3$.

Preferably, the first arm 250a of the protrusion 220a is formed to pass over the thin metal film 210.

The dielectric layer 220 has another protrusion 220a formed on the upper surface thereof, the protrusion 220a being formed to extend in a line from the second optical signal output section $O_2$ between the first and third optical signal output sections $O_1$ and $O_3$.

In the hybrid waveguide sensor according to the third embodiment of the invention, the dielectric waveguide and the metal waveguide are combined so as to be applied to a coupler-type interferometer, similar to the above-described embodiments. Further, the hybrid waveguide sensor has the output sections composed of three couplers.

In the MZI type waveguide according to the second embodiment, two lights are recombined so as to form a signal. In this embodiment, however, three couplers are used for mode coupling between the metal waveguide and the dielectric waveguide, and the mode coupling between two of the waveguides is used to exchange power. Three lines respectively have a phase shift of $2\pi/3$. This technique is used to select an optimal output such that a small phase shift can be measured. Further, a change in effective index can be measured by comparing three of the output sections $O_1$ to $O_3$.

That is, the third embodiment has an advantage in that three signals are compared so as to discriminate a change in effective index with respect to the same intensity change through the respective phase shifts.

Modification of Third Embodiment

Figure 12:
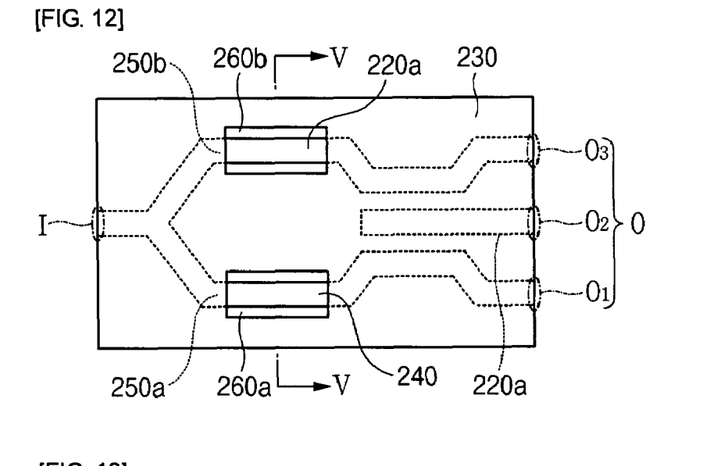
FIG. 12 is a plan view of a modification of the third embodiment.

Referring to FIGS. 12 and 10, a modification of the third embodiment will be described.

FIG. 12 is a plan view of a modification of the third embodiment. FIG. 10 also serves as a sectional view taken along V-V' line of FIG. 12.

A hybrid waveguide sensor according to the modification of the third embodiment has almost the same construction as the hybrid waveguide sensor according to the third embodiment. As shown in FIGS. 12 and 10, however, the hybrid waveguide sensor according to the modification of the third embodiment is different from the hybrid waveguide sensor according to the second embodiment in that another thin metal film 210b is further provided in the dielectric layer 220 under the second arm 250b.

More specifically, the hybrid waveguide sensor according to the modification of the third embodiment includes a dielectric layer 220 having one optical signal input section I formed in one end thereof, three of first to third optical signal output sections $O_1$ to $O_3$ formed in the other end thereof, and predetermined sizes of first and second thin metal films 210a and 210b which are provided in the dielectric layer 220 so as to be spaced at a predetermined distance from each other; a polymer layer 230 formed on and under the dielectric layer 220 and having first and second openings 260a and 260b formed to expose portions of the dielectric layer 220 corresponding to the first and second thin metal films 210a and 210b, the first and second openings 260a and 260b having a larger width than the first and second thin metal films 210a and 210b, respectively; and a receptor layer 240 formed on a portion of the dielectric layer 220 corresponding to the first thin metal film 210a exposed by the first opening 260a.

The dielectric layer 220 has a protrusion 220a formed on the upper surface thereof. Although the protrusion 220a is formed in one line at the optical signal input section I as one end of the dielectric layer 220, the protrusion 220a diverges into two lines at a predetermined position, thereby forming the first and second arms 205a and 250b. The first arm 250a is connected to the first optical signal output section $O_1$, and the second arm 250b is connected to the third optical signal output section $O_3$.

The first arm 250a of the protrusion 220a is formed to pass over the first thin metal film 210a, and the second arm 250b of the protrusion 220a is formed to pass over the second thin metal film 210b.

The dielectric layer 220 has another protrusion 220a formed on the upper surface thereof, the protrusion 220a extending in a line from the second optical signal output section $O_2$ between the first and third optical signal output sections $O_1$ and $O_3$.

In the modification of the third embodiment, the receptor layer 240 is formed only on a portion of the dielectric layer 220 exposed by the first opening 260a, but is not formed on a portion of the dielectric layer 220 exposed by the second opening 260b.

In such a structure, a portion of the second arm 250b serving as a reference part has the same condition as a portion of the first arm 250a serving as a sensing part such that actual sensitivity with respect to the reaction is further enhanced. That is, in the third embodiment, a reaction substance to be measured is inputted only into the sensing part having the receptor layer 240 formed therein. In the modification, however, a substance to be measured is inputted into the reference part and the sensing part, respectively. Then, a difference between the respective parts is reduced with respect to a signal on an idiosyncratic reaction substance such that a practical condition is met.

The modification of the third embodiment can obtain the same operation and effect as the third embodiment. Further, as described above, the sensing part including the thin metal film 210 except for the receptor layer is additionally constructed in the second arm 205b. Therefore, the surrounding environmental condition of a substance to be measured can be measured together, which makes it possible to perform sensing with higher precision.

Fourth Embodiment

Figure 13:
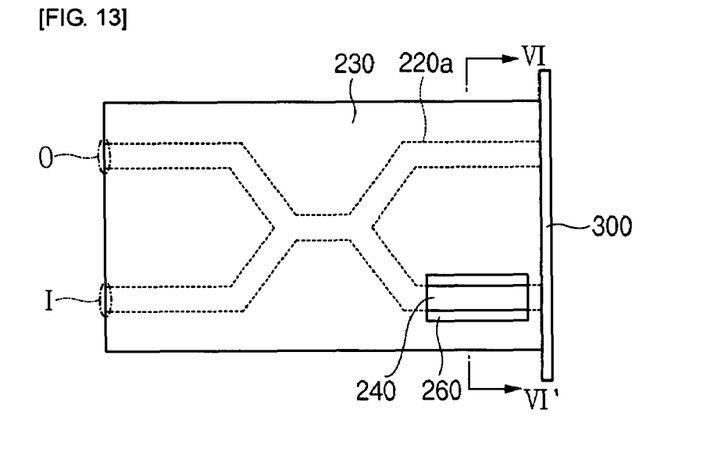
FIG. 13 is a plan view of a hybrid waveguide sensor according to a fourth embodiment of the invention.

Referring to FIGS. 13 and 7, a hybrid waveguide sensor according to a fourth embodiment of the invention will be described in detail.

FIG. 13 is a plan view of a hybrid waveguide sensor according to a fourth embodiment of the invention. FIG. 7 also serves as a sectional view taken along VI-VI' line of FIG. 13.

As shown in FIGS. 13 and 7, the hybrid waveguide sensor according to the fourth embodiment includes a dielectric layer 220 having one optical signal input section I and one optical signal output section O, which are formed in one end thereof, and a predetermined size of thin metal film 210 provided therein; a polymer layer 230 formed on and under the dielectric layer 220 and having an opening 260 formed to expose a portion of the dielectric layer 220 corresponding to the thin metal film 210, the opening 260 having a larger width than the thin metal film 210; and a receptor layer 240 formed on a portion of the dielectric layer 220 corresponding to the thin metal film 210 exposed by the opening 260.

The dielectric layer 220 has two lines of protrusions 220a formed on the upper surface thereof. The protrusions 220a are separately formed in a line at the optical signal input section I and the optical signal output section O, respectively, which are formed in one end of the dielectric layer 220. However, two lines of the protrusions 220a join each other at a predetermined position, thereby forming one line. Then, the line diverges into two lines at a predetermined position so as to extend to the other end of the dielectric layer 220.

One of the protrusions 220a is formed to pass over the thin metal film 210.

The hybrid waveguide sensor according to the fourth embodiment of the invention further includes a mirror surface 300 formed in the other end of the dielectric layer 220.

In the fourth embodiment of the invention, the optical signal input section I and the optical signal output section O are provided in the same side, and the mirror surface 300 is disposed in the opposite side, as described above. In such a structure, a signal inputted through the optical signal input section I is reflected by the mirror surface 300, and the reflected signal is measured by the optical signal output section O.

The hybrid waveguide sensor according to the fourth embodiment of the invention can obtain the same operation and effect as the MZI type hybrid waveguide sensor according to the second embodiment.

Modification of Fourth Embodiment

Figure 14:
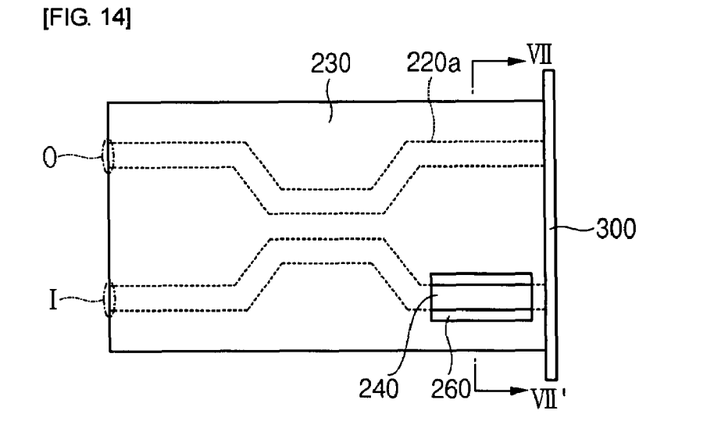
FIG. 14 is a plan view of a modification of the fourth embodiment.

Referring to FIGS. 14 and 7, a modification of the fourth embodiment will be described.

FIG. 14 is a plan view of a modification of the fourth embodiment. FIG. 7 also serves as a sectional view taken along VII-VII' line of FIG. 14.

The hybrid waveguide sensor according to the modification of the fourth embodiment has almost the same construction as the hybrid waveguide sensor according to the fourth embodiment. As shown in FIG. 14, however, the hybrid waveguide sensor according to the modification of the fourth embodiment is different from the hybrid waveguide sensor according to the fourth embodiment in that two lines of protrusions 220a formed in an optical signal input section I and an optical signal output section O, respectively, do not join each other, but independently extend to the other end of the dielectric layer 220.

More specifically, the hybrid waveguide sensor according to the modification of the fourth embodiment of the invention includes a dielectric layer 220 having one optical signal input section I and one optical signal output section, which are formed in one end thereof, and a predetermined size of thin metal film 210 provided therein; a polymer layer 230 formed on and under the dielectric layer 220 and having an opening 260 formed to expose a portion of the dielectric layer 220 corresponding to the thin metal film 210, the opening 260 having a larger width than the thin metal film 210; and a receptor layer 240 formed on a portion of the dielectric layer 220 corresponding to the thin metal film 210 exposed by the opening 260.

The dielectric layer 220 has two lines of protrusions 220a formed on the upper surface thereof. The protrusions 220a are separately formed at the optical signal input section I and the optical signal output section O, respectively, which are formed in one end of the dielectric layer 220, the protrusions 220a extending to the other end of the dielectric layer 220. Preferably, the protrusion 220a corresponding to the optical signal input section I is formed to pass over the thin metal film 210.

The hybrid waveguide sensor according to the modification of the fourth embodiment of the invention further includes a mirror surface 300 formed in the other end of the dielectric layer 220.

The modification of the fourth embodiment is constructed as a kind of coupler. Similar to the fourth embodiment, the optical signal input section I and the optical signal output section O are provided in the same side, and the mirror surface 300 is disposed in the opposite side. In such a structure, a signal inputted through the optical signal input section I is reflected by the mirror surface 300, and the reflected signal is measured by the optical signal output section O.

The hybrid waveguide sensor according to the modification of the fourth embodiment of the invention can obtain the same operation and effect as the fourth embodiment.

According to the hybrid waveguide sensor of the invention, the sensing part is constructed by the metal waveguide composed of the thin metal film and the dielectric layer surrounding the thin metal film, and the other portion is constructed by the dielectric waveguide. Therefore, the sensing part can obtain excellent sensitivity due to the SPP properties of the metal waveguide.

In other words, the entire waveguide sensor is not constructed by the metal waveguide, but the other portion excluding the sensing part is constructed by the dielectric waveguide. Therefore, it is possible to significantly reduce a propagation loss, compared with when the entire waveguide sensor is constructed by the metal waveguide.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A hybrid waveguide sensor comprising:
a dielectric layer having one optical signal input section formed in one end thereof and one optical signal output section formed in the other end thereof, the dielectric layer having a predetermined size of thin metal film provided therein;
a polymer layer formed on and under the dielectric layer and having an opening formed to expose a portion of the dielectric layer corresponding to the thin metal film, the opening having a larger width than the thin metal film; and
a receptor layer formed on a portion of the dielectric layer corresponding to the thin metal film exposed by the opening.

2. The hybrid waveguide sensor according to claim 1, wherein the dielectric layer has a protrusion formed on the upper surface thereof, the protrusion being formed in a straight line which connects the optical signal input section as one end of the dielectric layer and the optical signal output section as the other end thereof.

3. The hybrid waveguide sensor according to claim 2, wherein the protrusion passes over the thin metal film.

4. The hybrid waveguide sensor according to claim 1, wherein the dielectric layer has a protrusion formed on the upper surface thereof, the protrusion formed in one line at the optical signal input section as one end of the dielectric layer diverges into two lines at a predetermined position to thereby form first and second arms, and the first and second arms join each other at a predetermined position such so as to form one line at the optical signal output section.

5. The hybrid waveguide sensor according to claim 4, wherein the first arm of the protrusion passes over the thin metal film.

6. The hybrid waveguide sensor according to claim 1, wherein in the thin metal film, light is transmitted along the surface thereof as surface plasmon polariton modes.

7. A hybrid waveguide sensor comprising:
a dielectric layer having one optical signal input section formed in one end thereof and one optical signal output section formed in the other end thereof, the dielectric layer having predetermined sizes of first and second thin metal films disposed therein so as to be spaced at a predetermined distance;
a polymer layer formed on and under the dielectric layer and having first and second openings formed to expose portions of the dielectric layer corresponding to the first and second thin metal films, respectively, the first and second openings having a larger width than the first and second thin metal films; and
a receptor layer formed on a portion of the dielectric layer corresponding to the first thin metal film exposed by the first opening.

8. The hybrid waveguide sensor according to claim 7, wherein the dielectric layer has a protrusion formed on the upper surface, the protrusion formed in one line at the optical signal input section as one end of the dielectric layer diverges into two lines at a predetermined position to thereby form first and second arms, and the first and second arms join each other at a predetermined position so as to form one line at the optical signal output section.

9. The hybrid waveguide sensor according to claim 8, wherein the first arm of the protrusion passes over the first thin metal film, and the second arm of the protrusion passes over the second thin metal film.

10. A hybrid waveguide sensor comprising:
a dielectric layer having one optical signal input section formed in one end thereof and three of first to third optical signal output sections formed in the other end thereof, the dielectric layer having a predetermined size of thin metal film provided therein;
a polymer layer formed on and under the dielectric layer and having an opening formed to expose a portion of the dielectric layer corresponding to the thin metal film, the opening having a larger width than the metal thin film; and
a receptor layer formed on a portion of the dielectric layer corresponding to the thin metal film exposed by the opening.

11. The hybrid waveguide sensor according to claim 10, wherein the dielectric layer has a protrusion formed on the upper surface thereof, and the protrusion formed in one line at the optical signal input section as one end of the dielectric layer diverges into two lines at a predetermined position to thereby form first and second arms, the first arm being connected to the first optical signal output section and the second arm being connected to the third optical signal output section.

12. The hybrid waveguide sensor according to claim 11, wherein the first arm of the protrusion passes over the thin metal film.

13. The hybrid waveguide sensor according to claim 11, wherein the dielectric layer has another protrusion formed on the upper surface thereof so as to extend in a line from the second optical signal output section between the first and third optical signal output sections.

14. A hybrid waveguide sensor comprising:
a dielectric layer having one optical signal input section formed in one end thereof and three of first to third optical signal output sections formed in the other end thereof, the dielectric layer having predetermined sizes of first and second thin metal films disposed therein so as to be spaced at a predetermined distance from each other;
a polymer layer formed on and under the dielectric layer and having first and second openings formed to expose portions of the dielectric layer corresponding to the first and second thin metal films, respectively, the first and second openings having a larger width than the first and second thin metal films; and
a receptor layer formed on a portion of the dielectric layer corresponding to the first thin metal film exposed by the first opening.

15. The hybrid waveguide sensor according to claim 14, wherein the dielectric layer has a protrusion formed on the upper surface thereof, and the protrusion formed in one line at the optical signal input section as one end of the dielectric layer diverges into two lines at a predetermined position to thereby form first and second arms, the first arm being connected to the first optical signal output section and the second arm being connected to the third optical signal output section.

16. The hybrid waveguide sensor according to claim 15, wherein the first arm of the protrusion passes over the first thin metal film, and the second arm of the protrusion passes over the second thin metal film.

17. The hybrid waveguide sensor according to claim 15, wherein the dielectric layer has another protrusion formed on the upper surface thereof so as to extend in a line from the second optical signal output section between the first and third optical signal output sections.

18. A hybrid waveguide sensor comprising:
a dielectric layer having one optical signal input section and one optical signal output section formed in one end thereof, the dielectric layer having a predetermined size of thin metal film provided therein;
a polymer layer formed on and under the dielectric layer and having an opening formed to expose a portion of the dielectric layer corresponding to the thin metal film, the opening having a larger width than the thin metal film; and
a receptor layer formed on a portion of the dielectric layer corresponding to the thin metal film exposed by the opening.

19. The hybrid waveguide sensor according to claim 18, wherein the dielectric layer has two lines of protrusions formed on the upper surface thereof, the protrusions are separately formed in a line at the optical signal input section and the optical signal output section, respectively, which are formed in one end of the dielectric layer, two lines of the protrusions join each other at a predetermined position to thereby form one line, and the line diverges into two lines at a predetermined position so as to extend to the other end of the dielectric layer.

20. The hybrid waveguide sensor according to claim 19, wherein the protrusion passes over the thin metal film.

21. The hybrid waveguide sensor according to claim 19 further comprising
a mirror surface provided on the other end of the dielectric layer.

22. The hybrid waveguide sensor according to claim 18, wherein the dielectric layer has two lines of protrusions formed on the upper surface, and the protrusions are separately formed at the optical signal input section and the optical signal output section, respectively, which are formed in one end of the dielectric layer, the protrusions independently extending to the other end of the dielectric layer.

23. The hybrid waveguide sensor according to claim 22, wherein the protrusion formed at the optical signal input section passes over the thin metal film.

24. The hybrid waveguide sensor according to claim 22 further comprising
a mirror surface provided on the other end of the dielectric layer.

* * * * *